(12) United States Patent
Verdier

(10) Patent No.: US 11,592,091 B1
(45) Date of Patent: Feb. 28, 2023

(54) TORQUE CONVERTER ASSEMBLY INCLUDING THRUST WASHER

(71) Applicant: Schaeffler Technologies AG & Co. KG, Herzogenaurach (DE)

(72) Inventor: Joshua Verdier, Lodi, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 17/667,982

(22) Filed: Feb. 9, 2022

(51) Int. Cl.
  *F16H 41/28* (2006.01)

(52) U.S. Cl.
  CPC .................... *F16H 41/28* (2013.01)

(58) Field of Classification Search
  CPC .......... F16H 41/28; F16H 41/24; F16H 41/30; F16H 2045/021
  See application file for complete search history.

(56) References Cited

U.S. PATENT DOCUMENTS

| | | | | |
|---|---|---|---|---|
| 6,394,243 B1* | 5/2002 | Sasse | ...................... | F16H 45/02 192/70.12 |
| 6,508,346 B1* | 1/2003 | Simpson | ................. | F16H 45/02 192/3.3 |
| 10,451,158 B2 | 10/2019 | Vanni et al. | | |
| 10,539,212 B2* | 1/2020 | Welch | ..................... | F16H 41/28 |
| 11,280,393 B1* | 3/2022 | Flores | ..................... | F16H 45/02 |
| 2001/0013454 A1* | 8/2001 | Yamamoto | .............. | F16H 45/02 192/70.12 |
| 2006/0207851 A1* | 9/2006 | Heuler | .................... | F16H 45/02 192/3.3 |
| 2008/0156607 A1* | 7/2008 | Maienschein | .......... | F16H 45/02 192/3.29 |
| 2013/0224002 A1* | 8/2013 | Ito | .......................... | F16H 41/30 415/182.1 |
| 2017/0023116 A1* | 1/2017 | Jewell | ..................... | F16H 45/02 |
| 2017/0268649 A1* | 9/2017 | Matsuda | ................. | F16H 45/02 |
| 2018/0094713 A1* | 4/2018 | Maeda | .................... | F16H 41/24 |
| 2018/0163837 A1* | 6/2018 | Sato | ........................ | F16H 61/14 |
| 2018/0363749 A1* | 12/2018 | Cai | ......................... | F16H 45/02 |
| 2019/0353235 A1* | 11/2019 | Derhammer | ............ | F16H 45/02 |
| 2020/0263773 A1* | 8/2020 | Persinger | ................ | F16H 45/02 |

* cited by examiner

*Primary Examiner* — Kenneth Bomberg
*Assistant Examiner* — Ryan C Clark
(74) *Attorney, Agent, or Firm* — Volpe Koenig

(57) ABSTRACT

A torque converter assembly is disclosed herein. The torque converter assembly includes a thrust washer having a radially inner surface configured to engage against a drive shaft. A first axial surface of the thrust washer is configured to contact a cover. A second axial surface of the thrust washer is configured to contact a damper flange. The second axial surface of the thrust washer partially defines a first flow path. The thrust washer further comprises a second flow path configured to direct fluid in a first direction and a third flow path configured to direct fluid in a second direction. The thrust washer disclosed herein both provides an axial thrust bearing feature, and also provides three distinct flow paths or passages.

20 Claims, 4 Drawing Sheets

TORQUE CONVERTER ASSEMBLY INCLUDING THRUST WASHER

FIELD OF INVENTION

The present disclosure relates to a torque converter assembly, and more particularly relates to a thrust washer for a torque converter assembly.

BACKGROUND

Torque converter assemblies are well known. One known type of torque converter is a three-pass torque converter which includes three ports. The first two ports can generally be used for a charging function for the torque converter which requires fluid to be constantly flowing into the torus. This flow is also used for cooling friction facings which are in operation during steady state points while the vehicle is in motion to improve efficiency. A third port can be provided to actuate a piston with an isolated static pressure chamber to actuate the piston, which forces friction facings to compress and transmit torque and bypass the torus. In one aspect, this configuration requires higher pressure than the charge region or chamber but allows the area of the torque converter receiving charge pressure to operate at a lower pressure.

In certain conditions, the torus will exert a thrust load because of the fluid dynamics. Generally, conventional thrust washers or thrust bearings are used for supporting the load.

FIG. 1 illustrates one type of arrangement for a known torque converter design that includes a machined or forged component 5 that defines flow paths to keep the apply pressure separated from the charge pressure. Component 5 can function as a flow diverter, and can be arranged generally between a cover 1, pressure plate 2, and seal plate 3. Component 5 can be expensive to manufacture due to its geometry and specific design requirement.

It would be desirable to provide an improved configuration for a multi-pass (i.e. at least three-pass) torque converter that is inexpensive, durable, provides a reliable separation between different fluid chambers, and serve the purpose of supporting thrust loads coming from the turbine-damper assembly.

SUMMARY

A torque converter assembly is disclosed herein. The torque converter assembly includes a thrust washer having a radially inner surface configured to engage against a drive shaft. A first axial surface of the thrust washer is configured to contact a cover. A second axial surface of the thrust washer is configured to contact a damper flange. The second axial surface of the thrust washer defines a first flow path. The thrust washer further comprises a second flow path configured to direct fluid in a first direction and a third flow path configured to direct fluid in a second direction. The thrust washer disclosed herein both provides an axial thrust bearing feature, and also provides three distinct flow paths or passages.

A seal plate hub is configured to engage a radially outer surface of the thrust washer. The seal plate hub defines a first passage configured to receive fluid from the second flow path of the thrust washer and a second passage configured to receive fluid from the third flow path of the thrust washer.

The thrust washer is formed from plastic, in one aspect. One of ordinary skill in the art would understand that other materials and manufacturing methods could be used. The thrust washer does not require machining or forging processing steps, in one aspect.

The second flow path and the third flow path can overlap each other in a circumferential direction, in one aspect. The second and third flow paths can be slanted or oriented in an angled configuration such that the inlet and outlets of each flow paths are axially offset from each other. In this way, the flow paths can be provided in a single component (i.e. the thrust washer), and can be circumferentially offset from each other. Multiple flow paths of each of the second and third flow paths can be provided.

The seal plate hub can be configured to axially retain the thrust washer. This retention can be provided via at least one retainer configured to axially retain the thrust washer. The retainer can be formed as a bent over tab or staking tab. This aspect provides a simplified way to axially secure the thrust washer.

Various other secondary components for the torque converter assembly can be provided, and various interfaces or connections between these components can be provided. For example, the thrust washer can be configured to have an interference fit with the drive shaft. The thrust washer can also be configured to have an interference fit with the seal plate hub. The cover can be fixed to the seal plate hub, such as via welding or other connection arrangement. The thrust washer can be configured to provide a seal against the drive shaft and the cover. In one aspect, each side or face of the thrust washer provides a seal interface except for the side or face adjacent to the damper flange.

In one aspect, a seal plate can be attached to the seal plate hub. The seal plate can be attached to the seal plate hub via welding.

The first flow path and the third flow path can be configured to receive fluid from a first source, and the second flow path can be configured to receive fluid from a second source that is different than the first source.

A method of assembling a torque converter assembly is also provided herein.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
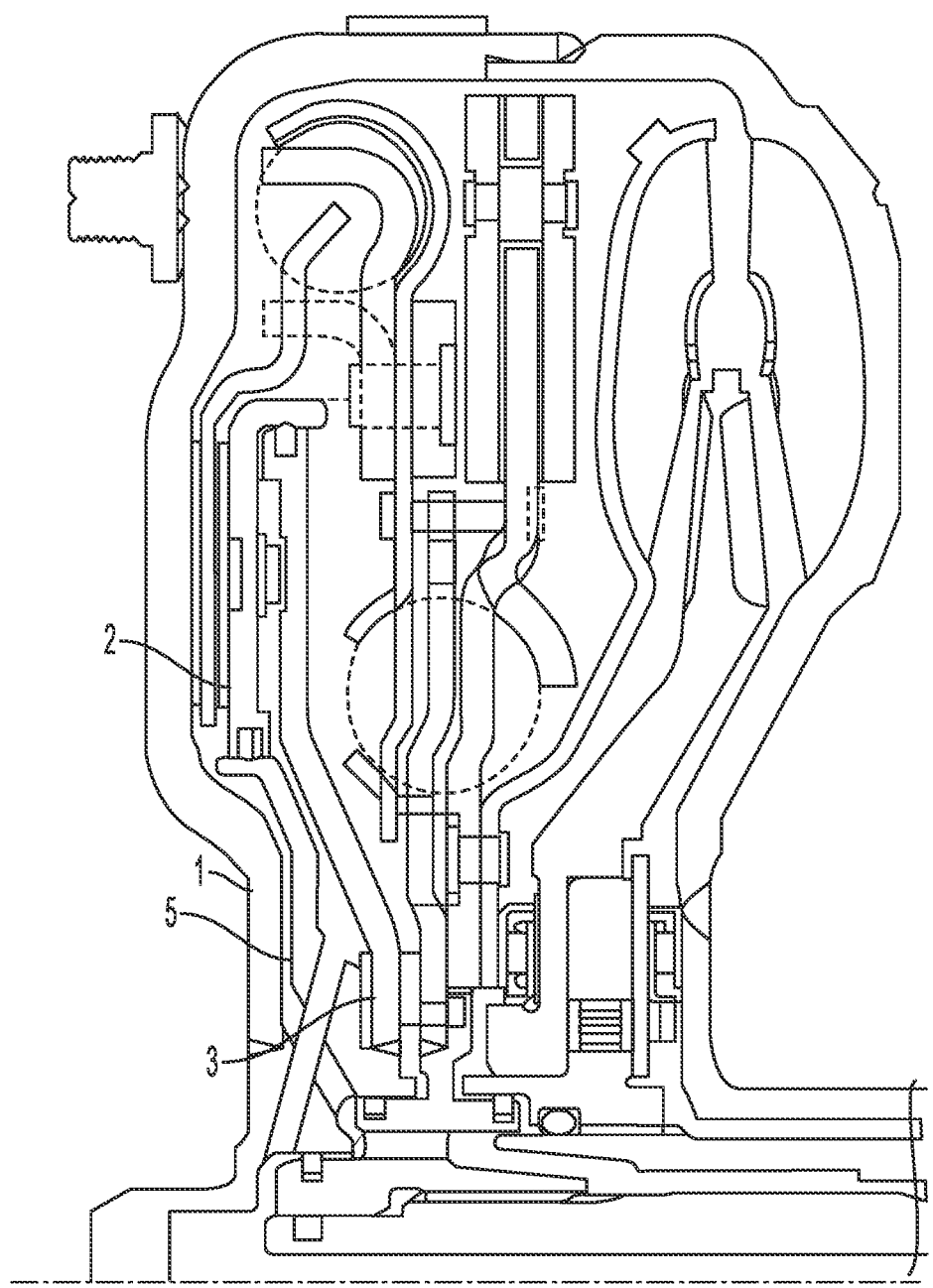
FIG. 1 is a cross-sectional view of a torque converter arrangement according to the prior art.
Figure 2:
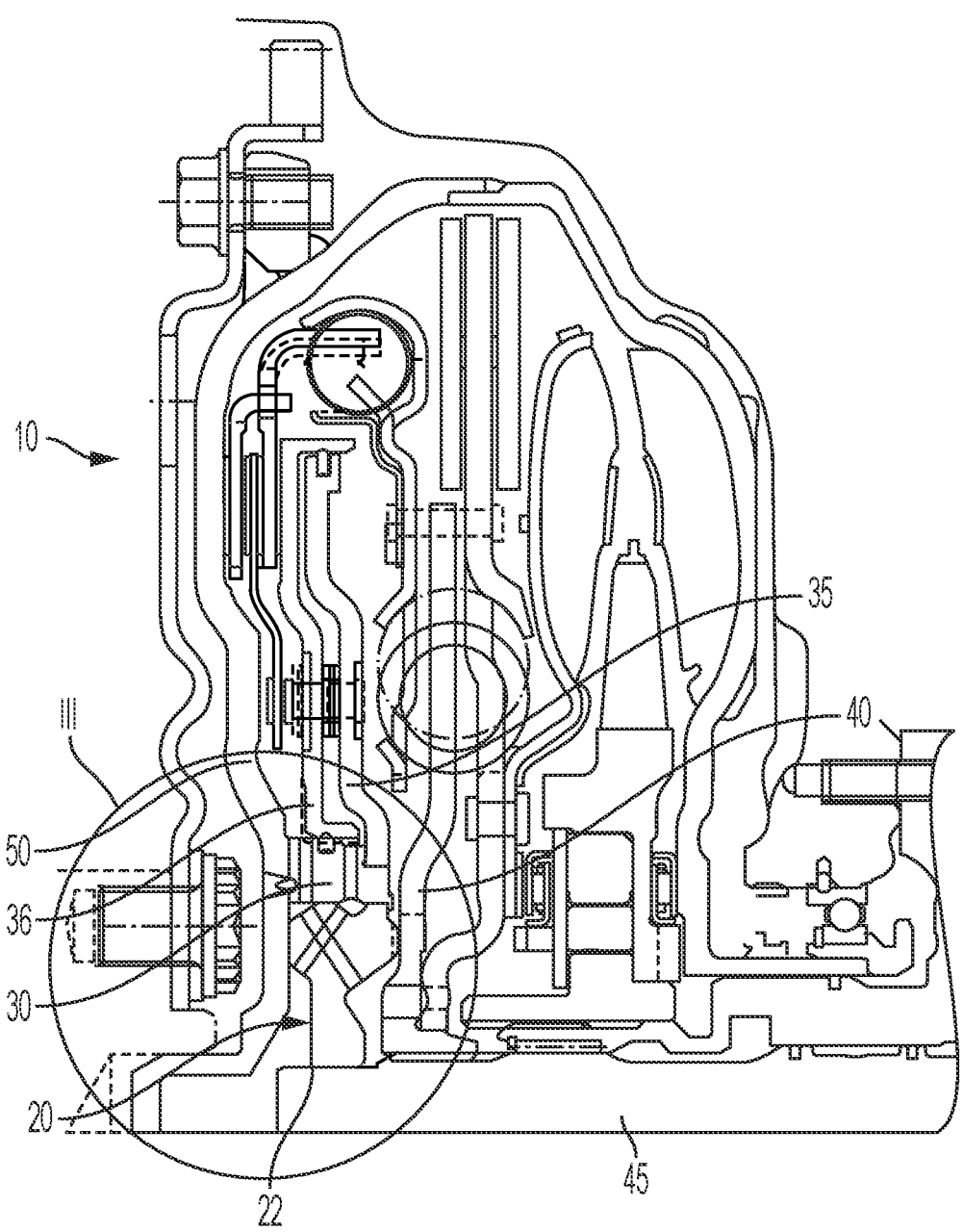
FIG. 2 is a cross-sectional view of a torque converter assembly including a thrust washer.

As shown in FIG. 2, a torque converter assembly 10 is disclosed herein. The torque converter assembly 10 generally can include a thrust washer 20, a seal plate hub 30, a seal plate 35, a damper flange 40, a drive shaft 45, and a cover 50. Additional features for the torque converter assembly 10 can be included. Additionally, the term torque converter assembly 10 can refer to fewer elements than generally disclosed herein.

Figure 4:
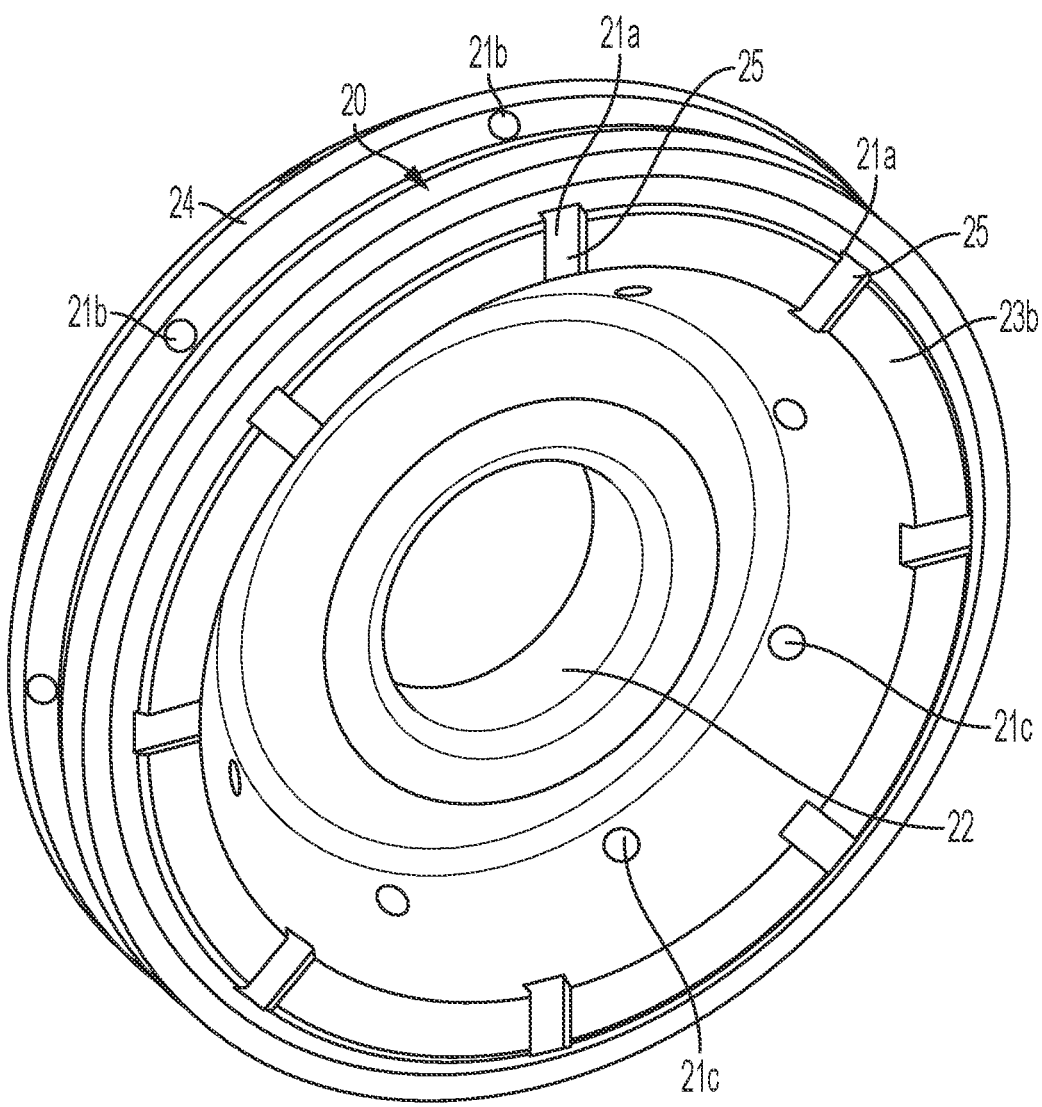
FIG. 4 is a perspective view of the thrust washer of FIGS. 2 and 3.

In one aspect, the thrust washer 20 provides flow paths for fluid to respective chambers and passages, as well as provides a bearing feature. The thrust washer 20 is shown in more detail in FIG. 4. In one aspect, the bearing feature, i.e. the thrust washer 20, is generally arranged between the cover 50 and the damper flange 40. The thrust washer 20 can generally provide at least two flow paths or passages. The thrust washer 20 can be configured to provide at least three flow paths, in one aspect.

The thrust washer 20 comprises a radially inner surface 22 configured to engage against the drive shaft 45. The thrust washer 20 can be secured to the drive shaft 45 via an interference fit, in one aspect. The thrust washer 20 can directly contact the drive shaft 45, and can provide a seal interface with the drive shaft 45, such that chambers on either axial side of the thrust washer 20 are separated and sealed from each other.

The thrust washer 20 includes a first axial surface 23a configured to contact the cover 50. In one aspect, the thrust washer 20 also provides a seal interface or surface with the cover 50. Additional details regarding this engagement and interface are provided herein.

Figure 3:
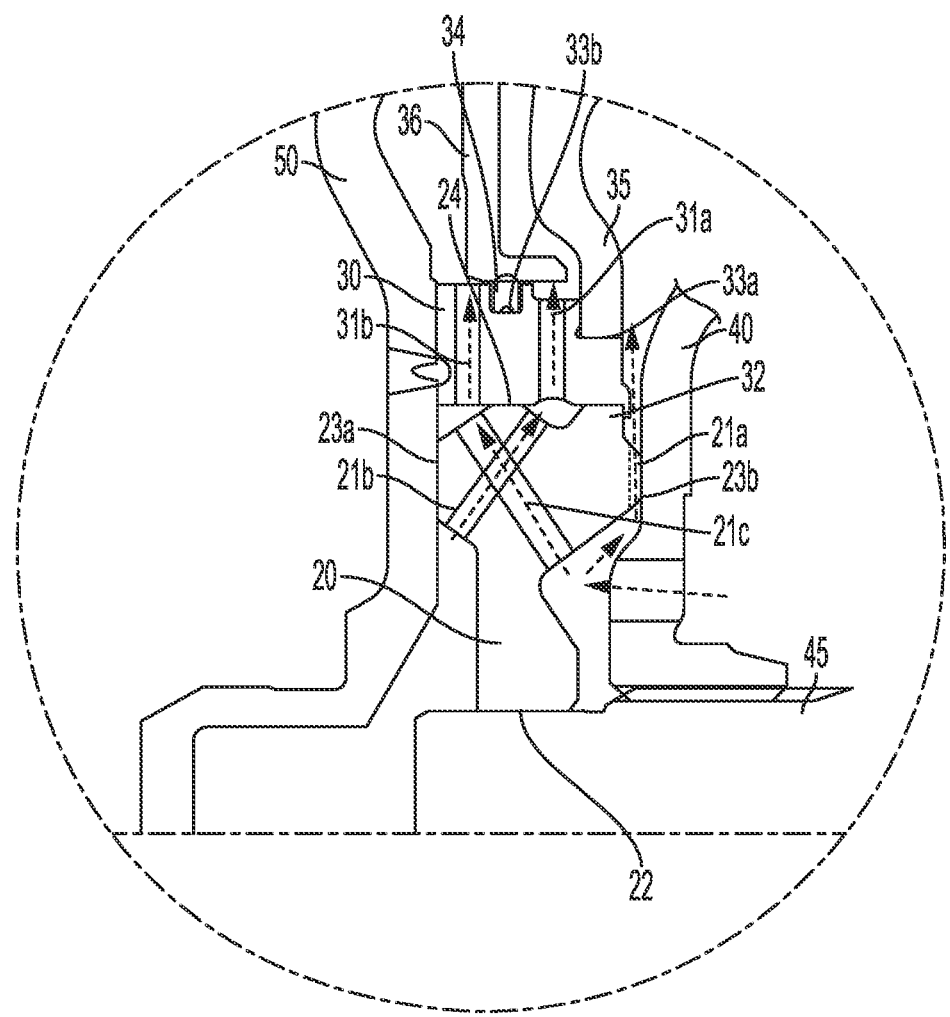
FIG. 3 is a magnified view of region "III" from FIG. 2.

The thrust washer 20 includes a second axial surface 23b configured to contact the damper flange 40 and support high axial loads. As shown in FIG. 3, a first flow path 21a is provided between the thrust washer 20 and the damper flange 40. In one aspect, the thrust washer 20 can include a groove or recess 25 that is configured to define the first flow path 21a. Alternatively, a plurality of protrusions can be provided on the second axial surface 23b that engage with the damper flange 40, and the first flow path 21a can be defined in circumferential regions between the protrusions. The first flow path 21a can have a boundary or perimeter defined partially by the damper flange 40 and partially by the thrust washer 20.

The thrust washer 20 can be formed as a plastic component, in one aspect. The thrust washer 20 can be formed as a polymeric component. The thrust washer 20 can be formed via injection molding, in one aspect. The thrust washer 20 does not require forging or other machining formation techniques or steps, in one aspect.

The thrust washer 20 further comprises a second flow path 21b configured to direct fluid in a first direction and a third flow path 21c configured to direct fluid in a second direction. In one aspect, the second flow path 21b and the third flow path 21c overlap with each other in a circumferential direction. The second flow path 21b and the third flow path 21c can each be slanted in an axial direction. The second flow path 21b and the third flow path 21c can each extend in a generally radial direction through the thrust washer 20. In one aspect, the second flow path 21b and the third flow path 21c can generally have the same size or diameter. In one aspect, the second flow path 21b and the third flow path 21c can have varying shapes, sizes, geometries, etc.

The first flow path 21a can be configured to receive fluid provided via an inlet in the drive shaft 45. For example, an inlet in the drive shaft 45 can provide fluid through an opening in the damper flange 40. The third flow path 21c can also be configured to receive fluid from the same source as the first flow path 21a, i.e. via an inlet formed in the drive shaft 45.

The seal plate hub 30 is configured to engage a radially outer surface 24 of the thrust washer 20. The seal plate hub 30 defines a first passage 31a configured to receive fluid from the second flow path 21b of the thrust washer 20 and a second passage 31b configured to receive fluid from the third flow path 21c of the thrust washer 20. The first and second passages 31a, 31b can be oriented in a radial direction, in one aspect. Other orientations, shapes, sizes, etc. can be provided for the first and second passages 31a, 31b.

In one aspect, the seal plate hub 30 is configured to axially retain the thrust washer 20. This retention can be configured to be achieved in a variety of ways, as one of ordinary skill in the art would appreciate from this disclosure. In one aspect, the seal plate hub 30 includes at least one retainer 32 configured to axially retain the thrust washer 20. The at least one retainer 32 can be formed as at least one staking tab that is bent over and engages the thrust washer 20. Multiple retainers 32 can be provided that are circumferentially spaced from each other. Alternatively, the at least one retainer 32 can include a tab that extends for 360 degrees.

The thrust washer 20 is configured to have an interference fit with the drive shaft 45, in one aspect. The thrust washer 20 is configured to have an interference fit with the seal plate hub 30, in one aspect. In this configuration, the thrust washer 20 provides sealing surfaces on respective radially inner and outer surfaces 22, 24. The thrust washer 20 further provides a sealing interface against the cover 50 on the surface 23a. The thrust washer 20 is configured to provide a seal against the seal plate hub 30, the drive shaft 45 and the cover 50, in one aspect.

The cover 50 can be fixed to the seal plate hub 30, in one aspect. The cover 50 can be fixed to the seal plate hub 30 via welding in one aspect. One of ordinary skill in the art would understand that various types of connections or fixation arrangements could be provided between these components.

A seal plate 35 can be connected or attached to the seal plate hub 30. The seal plate 35 can be attached to the seal plate hub 30 in a variety of ways. For example, the seal plate 35 can be welded to the seal plate hub 30. In one aspect, the seal plate hub 30 can include a shoulder 33a in which the seal plate 35 is arranged. The seal plate hub 30 can further include a groove 33b on a radially outer surface configured to receive a seal 34. The seal 34 can be configured to engage against a piston 36.

As shown in FIG. 3, the first flow path 21a and the third flow path 21c are configured to receive fluid from a first source, and the second flow path 21b is configured to receive fluid from a second source that is different than the first source. One of ordinary skill in the art would understand based on this disclosure that various configurations for the flow paths 21a, 21b, 21c can be provided.

A method of assembling a torque converter assembly 10 is also provided herein. The method includes attaching the seal plate 35 to the seal plate hub 30. This attachment can be achieved in a variety of ways, such as via welding or other permanent fixation arrangement. The method also includes attaching the cover 50 to the seal plate hub 30. This step can include welding the cover 50 to the seal plate hub 30. The method includes installing a thrust washer 20 inside of the seal plate hub 30, and axially securing the thrust washer 20 relative to the seal plate hub 30 via at least one retainer 32 provided on the seal plate hub 30 such that the cover 50 engages a first axial surface 23a of the thrust washer 20. The method further includes arranging a damper flange 40 against a second axial surface 23b of the thrust washer 20. The thrust washer 20 defines a first flow path 21a adjacent to the damper flange 40, a second flow path 21b configured to direct fluid in a first direction, and a third flow path 21c configured to direct fluid in a second direction. According to this method, multiple interfaces and connections between the components can be provided. For example, the thrust washer 20 can be configured to have an interference fit with the drive shaft 45, the thrust washer 20 can be configured to have an interference fit with the seal plate hub 30, and the thrust washer 20 can be configured to provide a seal against the drive shaft 45 and the cover 50. One of ordinary skill in the art would understand that various other types of connections and interfaces between adjacent components is possible.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

Log of Reference Numerals
cover 1
pressure plate 2
seal plate 3
component 5
torque converter assembly 10
thrust washer 20
first flow path 21a
second flow path 21b
third flow path 21c
radially inner surface 22
first axial surface 23a
second axial surface 23b
radially outer surface 24
groove or recess 25
seal plate hub 30
first passage 31a
second passage 31b
retainer 32
shoulder 33a
groove 33b
seal 34
seal plate 35
piston 36
damper flange 40
drive shaft 45
cover 50

What is claimed is:

1. A torque converter assembly comprising:
a thrust washer having a radially inner surface configured to engage against a drive shaft, a first axial surface configured to contact a cover, and a second axial surface configured to contact a damper flange, the second axial surface partially defining a first flow path, the thrust washer further comprising a second flow path configured to direct fluid in a first direction and a third flow path configured to direct fluid in a second direction; and
a seal plate hub configured to engage a radially outer surface of the thrust washer, the seal plate hub defining a first passage configured to receive fluid from the second flow path of the thrust washer and a second passage configured to receive fluid from the third flow path of the thrust washer.

2. The assembly according to claim 1, wherein the thrust washer is formed from plastic.

3. The assembly according to claim 1, wherein the second flow path and the third flow path overlap each other in a circumferential direction.

4. The assembly according to claim 1, wherein the seal plate hub is configured to axially retain the thrust washer.

5. The assembly according to claim 4, wherein the seal plate hub includes at least one retainer configured to axially retain the thrust washer.

6. The assembly according to claim 5, wherein the at least one retainer comprises at least one staking tab.

7. The assembly according to claim 1, wherein the thrust washer is configured to have an interface directly with the drive shaft to isolate different pressure zones.

8. The assembly according to claim 1, wherein the thrust washer is configured to have an interference fit with the seal plate hub.

9. The assembly according to claim 1, further comprising the cover, wherein the cover is fixed to the seal plate hub.

10. The assembly according to claim 9, wherein the cover is welded to the seal plate hub.

11. The assembly according to claim 1, wherein the thrust washer is configured to provide a seal against the drive shaft and the cover.

12. The assembly according to claim 1, further comprising a seal plate attached to the seal plate hub.

13. The assembly according to claim 12, wherein the seal plate is attached to the seal plate hub via welding.

14. The assembly according to claim 1, wherein the first flow path and the third flow path are configured to receive fluid from a first source, and the second flow path is configured to receive fluid from a second source that is different than the first source.

15. A method of assembling a torque converter assembly, the method comprising:
attaching a seal plate to a seal plate hub;
attaching a cover to the seal plate hub;
installing a thrust washer inside of the seal plate hub;
axially securing the thrust washer relative to the seal plate hub via at least one retainer provided on the seal plate hub such that the cover engages a first axial surface of the thrust washer; and
arranging a damper flange against a second axial surface of the thrust washer,
wherein the thrust washer defines a first flow path adjacent to the damper flange, a second flow path configured to direct fluid in a first direction, and a third flow path configured to direct fluid in a second direction.

16. The method according to claim 15, wherein the second flow path and the third flow path overlap each other in a circumferential direction.

17. The method according to claim 15, wherein the thrust washer is formed from plastic.

18. The method according to claim 15, wherein the thrust washer is configured to have an interference fit with a drive shaft, the thrust washer is configured to have an interference fit with the seal plate hub, and the thrust washer is configured to provide a seal against the drive shaft and the cover.

19. The method according to claim 15, wherein the at least one retainer comprises at least one staking tab.

20. The method according to claim 15, wherein the seal plate hub defines a first passage configured to receive fluid from the second flow path of the thrust washer, and a second passage configured to receive fluid from the third flow path of the thrust washer.

\* \* \* \* \*